Patented Aug. 14, 1945

2,382,184

UNITED STATES PATENT OFFICE 2,382,184

RESINOUS MATERIALS AND METHOD FOR THE PRODUCTION THEREOF

Kenneth M. Thompson, Aldan, Pa., assignor to The Atlantic Refining Company, Philadelphia, Pa., a corporation of Pennsylvania No Drawing. Application May 3, 1941,
Serial No. 391,715

12 Claims. (Cl. 260—53)

The present invention relates to the production of resinous materials from hydrocarbon oils by reaction with aldehydes in the presence of a condensing agent comprising an active boron compound.

An object of this invention is the preparation of resins from petroleum oil distillates, and particularly cracked tar distillates containing cyclic hydrocarbons by reaction with an aldehyde in the presence of a condensing agent from the group comprising $BF_3$ etherate, $BF_3$ alcoholate, dihydroxyfluoboric acid ($H_2BO_2F_2$), dihydroxyfluoboric acid-boron fluoride addition compound ($H_2BO_2F_2.BF_3$), or mixtures of two or more of such agents.

A further object of this invention is the preparation of modified resins from petroleum oil fractions containing cyclic hydrocarbons by reaction with an aldehyde in the presence of a condensing agent of the type aforementioned, and the further reaction or condensation of the resulting product with an additional organic compound to modify the properties of such product.

It has been proposed heretofore to prepare resinous materials by reacting aromatic hydrocarbons with aldehydes in the presence of strong condensing agents such as $H_2SO_4$, $FeCl_3$, $ZnCl_2$, and $AlCl_3$, or by reacting cracked tar distillates or aromatic petroleum fractions with aldehydes in the presence of condensing agents such as $H_2SO_4$, $FeCl_3$, $ZnCl_2$, and $AlCl_3$ which have been modified by the addition of a substantial quantity of a lower aliphatic acid such as acetic acid.

I have found that improved resins may be produced in accordance with my invention by reacting cyclic hydrocarbons or oils containing cyclic hydrocarbons with aldehydes, in the presence of a condensing agent comprising an active boron compound, and that such resins are superior to those produced by the prior art processes particularly with respect to color, softening point, resistance to alkalis, and resistance to weathering.

My process comprises essentially reacting an oil containing cyclic hydrocarbons with an aldehyde, in the presence of a condensing agent comprising an active boron compound at a temperature sufficiently elevated to effect reaction or chemical condensation of the ingredients to form a resinous material. The resinous material, after removal of the condensing agent, may be separated from unreacted oil by distillation under reduced pressure or by treatment with solvents. In one modification of my process there may be added to the reaction mixture or to the reaction product, during or after the completion of the initial reaction, an additional chemical compound or compounds to modify the properties of the resinous product.

Resins may be prepared by my process from petroleum oils and coal tar oils or fractions thereof containing substantial amounts of cyclic hydrocarbons and other compounds having the property of condensing with aldehydes. Such oils or fractions may be obtained by distillation, solvent extraction, or other suitable means, of naturally occurring petroleum oils or coal tar, and products of cracking, oxidation, hydrogenation, dehydrogenation, destructive hydrogenation, or chemical treatment thereof. Among the hydrocarbons which may be employed are cracked or uncracked petroleum distillates, high boiling oils from cracked tar, styrene, indene, and cumene, the polymers thereof, or oils containing such compounds, olefin polymers, terpene hydrocarbons, and alkylated aromatic hydrocarbon mixtures produced by the hydrolysis of petroleum sludge sulfonic acids. Hydrocarbon oils containing cyclic hydrocarbons boiling approximately within the range of from 100° F. to 750° F., and preferably within the range of 250° F. to 550° F., are suitable for use in accordance with my invention. I have found that improved resins of light color may be prepared by subjecting the petroleum friction to a preliminary treatment with a refining agent in order to remove the color-forming bodies and other highly active constituents which readily condense to form insoluble and infusible bodies. The treated oil fraction partially or completely freed of such bodies is then subjected to reaction with an aldehyde, in accordance with my process. The preliminary treatment may be conducted with sulfuric acid, aluminum chloride, decolorizing adsorbents such as fuller's earth or bauxite, or other refining agents. This pretreatment should not be carried to such a degree as to remove any considerable quantity of the resin-forming constituents of the oil fraction.

Any aldehyde or compound containing an aldehyde group which has the property of condensing with cyclic hydrocarbons to form resinous materials may be employed. The aldehydes may be used as such or in polymerized form. Exemplary of these aldehydes are formaldehyde, formalin paraformaldehyde, acetaldehyde, propionaldehyde, butyraldehyde, valeric aldehyde, glyoxal glycolaldehyde, pyroracemic aldehyde, aldol, crotonaldehyde, acrolein, glyoxylic acid, furfural, benzaldehyde, cyclohexylaldehyde, and aldehydes produced by the partial oxidation of hydrocarbon oils and waxes.

In carrying out my condensation reactions to produce improved resinous materials, I use condensation agents or catalysts comprising an active boron compound such as $BF_3$ etherate, $BF_3$ alcoholate, $H_3BO_2F_2$, $H_3BO_2F_2.BF_3$, and mixtures of $BF_3$ etherate and $H_3BO_2F_2$. The quantity of condensing agent or catalyst utilized may vary from a few per cent up to 25 per cent by weight of the reactants.

The $BF_3$ etherate may be produced by saturating a lower aliphatic ether, such as diethyl ether with $BF_3$, and distilling the product to obtain a fraction boiling between 255° F. and 260° F. comprising substantially $BF_3$ etherate. The $BF_3$ alcoholate may be prepared in a similar manner, utilizing lower aliphatic alcohols such as methyl alcohol, ethyl alcohol, or propyl alcohol.

The dihydroxyfluoboric acid ($H_3BO_2F_2$) may be prepared by two types of reactions. First it may be prepared by the reaction of $BF_3$ upon solid boric acid ($H_3BO_3$). A second method comprises passing anhydrous hydrofluoric acid ($H_2F_2$) into boric oxide ($B_2O_3$), and heating to drive off $BF_3$.

The dihydroxyfluoboric acid-boron fluoride addition compound ($H_3BO_2F_2.BF_3$) may be prepared by treating $H_3BO_2F_2$ with a molecularly equivalent amount of $BF_3$.

In accordance with my invention, the resin-producing reaction may be carried out at temperatures between 150° F. and 400° F., and preferably between 175° F. and 250° F. Reaction times may vary from a few hours to several days, times of the order of 5 to 15 hours being preferred. In general, the reaction when carried out for a relatively short time at high temperature produces dark colored resins, whereas at longer times and lower temperatures, relatively light colored resins are obtained. The proportions of the reactants may be varied considerably, depending upon the characteristics desired of the resinous products. Also, depending upon the composition and proportion of the reactants and upon the operating conditions, the resinous products obtained may range from viscous, tacky materials to hard, solid materials of relatively high softening point. The rate of resin formation may be substantially increased by employing an inert diluent which functions as a mutual solvent for the reactants, thereby permitting more intimate contact between the reactants themselves as well as the condensing agent. Mutual solvents such as chlorinated hydrocarbons, i. e., carbon tetrachloride, ethylene dichloride, and the like, or low boiling aromatic hydrocarbons such as benzene, have been found quite suitable. If desired, the resin-forming reaction may be carried out under super-atmospheric pressure, for example, pressures up to several thousand pounds per square inch, in order to maintain the reactants or mutual solvents substantially in the liquid phase.

In another aspect of my invention, I have found that I may modify the properties of my resinous products by adding to the reaction mixture or to the reaction product, during or after completion of the initial reaction, an additional chemical compound or compounds capable of entering into the condensation reaction, i. e., co-condensing or co-polymerizing with the initial reactants or reaction product, or with themselves. For example, I may react a petroleum fraction containing cyclic hydrocarbons with an aldehyde in the presence of an active boron compound hereinbefore mentioned, and during the reaction or after the reaction has been completed, I may add one or more reactive chemical compounds, for example, phenol, with or without additional aldehyde, and effect further condensation whereby the phenol enters into the resin-forming reaction to modify the properties of the resinous product. A variety of chemical compounds may be employed for this purpose, including phenolic compounds such as phenol, the alkylated phenols, cresols, xylenols, the ethyl phenols, the propyl phenols, the butyl phenols, the amyl phenols, and the petroleum phenols; the polyhydric alcohols and alcohol-ethers such as ethylene glycol, propylene glycol, butylene glycol, glycerol, diethylene glycol methyl, ethyl, propyl, and butyl ethers; urea and the substituted ureas; thiourea and the substituted thioureas; and the aliphatic and aromatic mono- and diamines, including methyl, ethyl, propyl, butyl, and amyl amines, aniline, phenylene diamine; amides and diamides; aliphatic and aromatic ketones; aliphatic and aromatic esters; fatty oils, and drying oils such as tung oil, linseed oil, and the like. Polycarboxylic acids and anhydrides may also be employed, including oxalic acid, succinic acid, malonic acid, glutaric acid, pyrotartaric acid, tartaric acid, pimelic acid, fumaric acid, maelic acid, adipic acid, phthalic acid, trimesic acid, trimellitis acid, amino polycarboxylic acids, mixtures of two or more of these acids, the anhydrides of such acids or mixtures thereof. In addition to the polycarboxylic acids and anhydrides, or in lieu thereof, I may employ monocarboxylic acids such as formic acid, acetic acid, propionic acid, butyric acid, and the higher homologues of this series.

My invention may be further illustrated by the examples given in the following table, which, however, are not to be construed as limiting the scope thereof. The procedure employed in producing the resins comprised admixing the reactants and heating the mixture, with agitation, at the temperature and for the time specified. The reaction mixture was then cooled and diluted with 180 parts by weight of benzene to dissolve the resinous product, and the benzene solution was filtered free of unreacted solid materials and condensation agent, and then thoroughly washed with water. The benzene and unreacted oil was distilled from the resinous product, the ultimate distillation temperature being 550° F. at 3 mm. pressure.

The oil stocks used in the examples were produced as follows:

Stock A.—An oil fraction containing cyclic hydrocarbons was distilled from a pressure still cracked tar, and such fraction was treated with 5 pounds of 66° $H_2SO_4$ per barrel of oil, and after separation of acid sludge, was filtered through 30–60 mesh #1 fuller's earth, using 20 pounds of earth per barrel of oil. The resulting oil had a distillation over point of 468° F. at atmospheric pressure and an end point of 752° F. at atmospheric pressure (over point of 218° F. at 10 mm. pressure and end point of 502° F. at 10 mm. pressure), an A. P. I. gravity of 18.5°, a Saybolt Universal viscosity at 100° F. of 65 seconds, an A. S. T. M. color of 2, an aniline point of 106° F., and a bromine number of 11.

Stock B.—A straight run petroleum naphtha containing cyclic hydrocarbons having a distillation over point of 220° F. and an end point of 435° F., and an A. P. I. gravity of 52.5° was treated with 10 per cent by volume of 98 per cent $H_2SO_4$ at 180° F. for ½ hour. The treated oil was then separated from the acid sludge, and the acid sludge was diluted with 5 per cent by volume of water, and the resulting dilute $H_2SO_4$ then separated from the aromatic sulfonic acid layer. The sulfonic acids were then diluted with water and steamed at a temperature not exceeding 350° F., whereupon the sulfonic acids were hydrolyzed to alkylated aromatic hydrocarbons and dilute $H_2SO_4$. The aromatic hydrocarbons were distilled from the hydrolysis mixture, and there was recovered an aromatic hydrocarbon fraction having a distillation over point of 275° F. and an end point of 463° F., and A. P. I. gravity of 28.4°, an aniline point of below −14° F., and an A. S. T. M. color of +19.

The $H_3BO_2F_2$ condensation catalyst was produced by reacting 2 moles of $H_3BO_3$ with 1 mole of $BF_3$, and distilling the product to obtain a fraction boiling between 311° F. and 329° F. comprising substantially $H_3BO_2F_2$. The $BF_3$ etherate was produced by saturating ethyl ether with $BF_3$ and distilling the product to obtain a fraction boiling between 255° F. and 260° F. comprising substantially $BF_3$ etherate. The $H_3BO_2F_2$—$BF_3$ etherate was prepared by mixing equal parts of $H_3BO_2F_2$ and $BF_3$ etherate.

at a temperature productive of the condensation of cyclic hydrocarbons and the aldehyde to a useful resinous material.

2. A process which comprises reacting a petroleum oil fraction boiling within the range of from 100° F. to 750° F. and containing cyclic hydrocarbons with an aldehyde in the presence of a condensing agent from the group consisting of $BF_3$ etherate, $BF_3$ alcoholate, $H_3BO_2F_2$, and $H_3BO_2F_2.BF_3$, at a temperature productive of the condensation of cyclic hydrocarbons and the aldehyde to a useful resinous material.

3. A process which comprises reacting a distillate fraction of a cracked petroleum tar containing cyclic hydrocarbons with an aldehyde in the presence of a condensing agent from the group consisting of $BF_3$ etherate, $BF_3$ alcoholate, $H_3BO_2F_2$, and $H_3BO_2F_2.BF_3$, at a temperature productive of the condensation of cyclic hydrocarbons and the aldehyde to a useful resinous material.

4. The method of producing a resinous material, which comprises reacting a petroleum oil fraction containing cyclic hydrocarbons with an alde-

|  | Example | | | | | | | | | | | | |
|---|---|---|---|---|---|---|---|---|---|---|---|---|---|
|  | 1 | 2 | 3 | 4 | 5 | 6 | 7 | 8 | 9 | 10 | 11 | 12 | 13 |
| Oil Stock A ............parts by weight.. | 100 | 100 | 100 | 100 | 100 |  |  |  |  |  |  |  |  |
| Oil Stock B ............do.... |  |  |  |  |  | 100 | 100 | 100 | 100 | 100 | 100 | 100 | 100 |
| Paraformaldehyde ............do.... | 13 | 11.7 | 13 | 13 | 19.6 | 25.2 | 25.3 | 25.3 | 25.2 | 31.0 | 13 | 26 | 26 |
| Acetic acid ............do.... | 74 | 76 |  |  |  | 74 | 74 | 74 | 75 | 75 |  |  |  |
| Adipic acid ............do.... |  |  |  | 13 |  |  |  |  |  |  |  |  | 4.4 |
| Phthalic anhydride ............do.... |  |  | 13 |  | 13 |  |  |  |  |  | 13 | 34.7 |  |
| Solvent (CCl$_4$) ............do.... |  |  |  |  | 396 |  |  |  |  |  |  |  |  |
| Catalyst: |  |  |  |  |  |  |  |  |  |  |  |  |  |
| BF$_3$ etherate ............parts by weight.. | 2.6 |  |  |  | 0.65 |  | 3.5 |  |  |  |  |  |  |
| H$_3$BO$_2$F$_2$ ............do.... |  | 0.86 |  |  |  | 3.5 |  | 3.3 |  |  |  |  |  |
| H$_3$BO$_2$F$_2$+BF$_3$ etherate ............do.... |  |  | 2.6 | 2.6 |  |  |  |  | 3.5 | 3.5 | 2.6 | 2.6 | 2.6 |
| Conditions: |  |  |  |  |  |  |  |  |  |  |  |  |  |
| Temperature ............°F... | 226 | 226 | 210 | 210 | 175 | 220 | 226 | 226 | 226 | 226 | 226 | 226 | 226 |
| Time ............hours.. | 11 | 10 | 10 | 5 | 2 | 10 | 10 | 10 | 15 | 20 | 8 | 2 | 5 |
| Resin Product: |  |  |  |  |  |  |  |  |  |  |  |  |  |
| Yield ............parts by weight.. | 64.6 | 52.8 | 33.5 | 65.2 | 32.6 | 47.0 | 50.0 | 57.0 | 68.0 | 80.0 | 30.4 | 54.4 | 47.8 |
| Softening point (B. & R.) | 199 | 191 | 210 | 222 | 204 | 131 | 126 | 140 | 143 | 142 | 153 | 160 | 166 |
|  | 2,790 | 969 | 2,030 | 2,075 | 1,990 | 63 | 75 | 100 | 105 | 96 | 176 | 62 | 1,510 |
| O. D. color |  |  |  |  |  |  |  |  |  |  |  |  |  |
| Solubility in: |  |  |  |  |  |  |  |  |  |  |  |  |  |
| Benzene | S | S | S | S | S | S | S | S | S | S | S | S | S |
| CCl$_4$ | S | S | S | S | PS | S | S | S | S | S | S | S | S |
| 48° petroleum naphtha | S | S | PS | PS | PS | S | S | S | S | S | S | S | PS |
| Petroleum ether | PS | PS | I | I | I | S | S | S | S | S | S | S | S |
| Acetone | PS | PS | S | PS | S | S | S | S | S | S | S | S | S |
| Ethyl alcohol | I | I | I | I | I | I | I | I | I | I | I | I | I |

S=soluble.
PS=partly soluble.
I=insoluble.

While, in the above examples, I have shown the use of specific reactants, condensing agents, and quantities, as well as specific conditions for carrying out my resin-producing process, it is to be understood that the reactants, quantities, and conditions may be varied considerably, depending upon the properties desired in the resinous products.

The resins of the present invention can be made in wide variety ranging from heavy viscous oils, which may be used in rubber compounding, adhesives, plastic compounds, and fly paper, to hard solids of high melting point, which find application in surface coating compositions, cast and moulded articles, such as enamels, varnishes, pipe coatings, inks, waterproofing, insulating compounds, and floor tile.

What I claim is:

1. A process which comprises reacting a petroleum oil fraction containing cyclic hydrocarbons with an aldehyde in the presence of a condensing agent from the group consisting of $BF_3$ etherate, $BF_3$ alcoholate, $H_3BO_2F_2$, and $$H_3BO_2F_2.BF_3$$

hyde at a temperature between 150° F. and 400° F. in the presence of a condensing agent from the group consisting of $BF_3$ etherate, $BF_3$ alcoholate, $H_3BO_2F_2$, and $H_3BO_2F_2.BF_3$.

5. A process which comprises reacting a petroleum oil fraction containing cyclic hydrocarbons with formaldehyde in the presence of a condensing agent from the group consisting of $BF_3$ etherate, $BF_3$ alcoholate, $H_3BO_2F_2$, and $$H_3BO_2F_2.BF_3$$

at a temperature productive of the condensation of cyclic hydrocarbons and the aldehyde to a useful resinous material.

6. A resin produced by the reaction of a petroleum oil fraction boiling within the range of from 100° F. to 750° F. and containing cyclic hydrocarbons with formaldehyde in the presence of a condensing agent from the group consisting of $BF_3$ etherate, $BF_3$ alcoholate, $H_3BO_2F_2$, and $H_3BO_2F_2.BF_3$ at a temperature of between 150° F. and 400° F.

7. A resin produced by the reaction of a distillate fraction of a cracked petroleum tar boiling within the range of from 100° F. to 750° F. and containnig cyclic hydrocarbons with formaldehyde in the presence of a condensing agent from the group consisting of $BF_3$ etherate, $BF_3$ alcoholate, $H_3BO_2F_2$, and $H_3BO_2F_2.BF_3$, at a temperature of between 150° F. and 400° F.

8. A process which comprises reacting a petroleum oil fraction containing cyclic hydrocarbons with a lower aliphatic aldehyde in the presence of a condensing agent from the group consisting of $BF_3$ etherate, $BF_3$ alcoholate, $H_3BO_2F_2$, and $H_3BO_2F_2.BF_3$, at a temperature productive of the condensation of the cyclic hydrocarbons and the aldehyde to a useful resinous material.

9. A process which comprises reacting a petroleum oil fraction containing cyclic hydrocarbons with an aldehyde and an aromatic hydroxy compound in the presence of a condensing agent from the group consisting of $BF_3$ etherate, $BF_3$ alcoholate, $H_3BO_2F_2$, and $H_3BO_2F_2.BF_3$, at a temperature productive of the condensation of the reactants to a useful resinous material.

10. A process which comprises reacting a petroleum oil fraction containing cyclic hydrocarbons with an aldehyde in the presence of a condensing agent from the group consisting of $BF_3$ etherate, $BF_3$ alcoholate, $H_3BO_2F_2$, and $H_3BO_2F_2.BF_3$, and further reacting the resulting product with an aromatic hydroxy compound, said reaction being conducted at a temperature productive of the condensation of the reactants to a useful resinous material.

11. In a process of making a resin by the reaction of an aldehyde upon an aromatic hydrocarbon, the step which comprises subjecting a mixture of an aldehyde and an aromatic hydrocarbon to the condensing influence of a catalyst selected from the group consisting of $BF_3$ etherate, $BF_3$ alcoholate, $H_3BO_2F_2$, and $H_3BO_2F_2.BF_3$, at a temperature productive of the condensation of the reactants to a useful resin.

12. In a process of making a resin by the reaction of an aldehyde upon an aromatic hydrocarbon, the step which comprises subjecting a mixture of an aldehyde and an aromatic hydrocarbon boiling within the range of 100° F. to 750° F. to the condensing influence of a catalyst selected from the group consisting of $BF_3$ etherate, $BF_3$ alcoholate, $H_3BO_2F_2$, and $H_3BO_2F_2.BF_3$, at a temperature productive of the condensation of the reactants to a useful resin.

KENNETH M. THOMPSON.